UNITED STATES PATENT OFFICE.

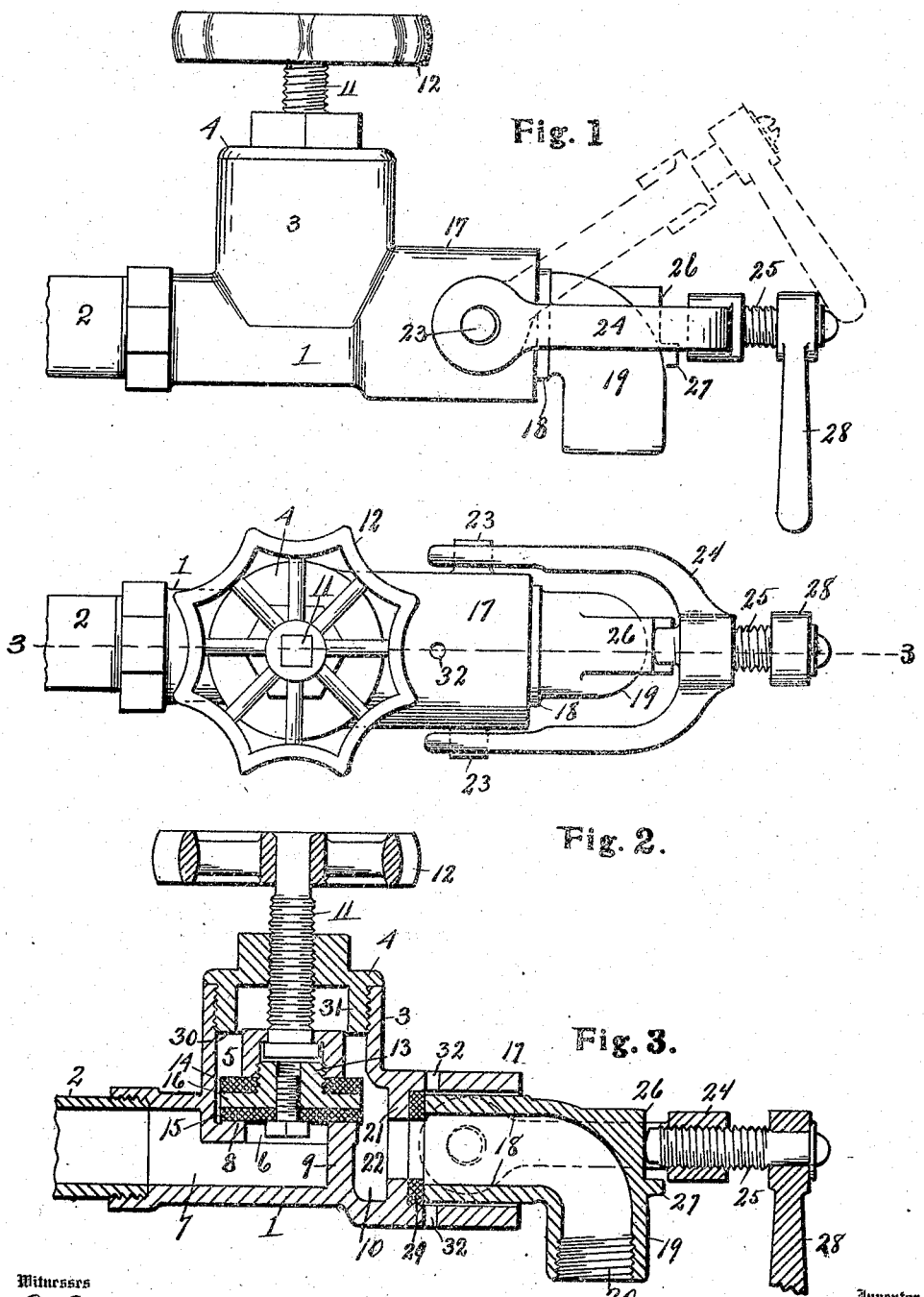

FREDERICK W. ROCK, OF DETROIT, MICHIGAN, ASSIGNOR OF ONE-HALF TO EDWARD A. FIELD, OF DETROIT, MICHIGAN.

AIR-HOSE COUPLING.

941,652.

Specification of Letters Patent. Patented Nov. 30, 1909.

Application filed July 9, 1908. Serial No. 442,689.

*To all whom it may concern:*

Be it known that I, FREDERICK W. ROCK, a citizen of the United States, residing at Detroit, in the county of Wayne, State of Michigan, have invented certain new and useful Improvements in Air-Hose Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to air hose couplings, and consists in the construction and arrangement of parts hereinafter more fully set forth and claimed.

The object of the invention is to provide simple and efficient means for connecting an air hose to and disconnecting said hose from the supply pipe in compressed air systems, the arrangement being such as to enable a hose to be quickly coupled to said supply pipe and readily uncoupled therefrom in a manner to obviate leakage of air when a coupling is made.

The invention further contemplates provision for obviating injury to the operator when removing the coupling member of the hose from the socket of the fitting connected with the supply pipe by the blowing out of said coupling member due to the expansive force of the air under pressure in said hose, said provision consisting of a vent opening which permits the escape of the compressed air contained in the hose as soon as the clamp is released that holds said coupling member in position and prior to the removal of said clamp to permit of the retraction of said member.

It is a common practice where compressed air is employed in factories to run a main supply pipe to which certain fittings are attached adapted to receive a coupling member on the air hose, the compressed air being employed to drive hammers, chippers, drills, etc., and the operator being obliged to move the hose from place to place so that means for facilitating the coupling of the air hose to the source of supply and the uncoupling of said hose therefrom is essential to obviate loss of time, and it is further essential that the coupling means be of such a character as to prevent a leakage of air combined with the element of safety to the operator when disconnecting the coupling parts.

The above mentioned requisites are comprised in the structure shown in the accompanying drawings, in which:—

Figure 1 is a side elevation of the coupling parts made in accordance with my invention. Fig. 2 is a top plan view of Fig. 1. Fig. 3 is a central longitudinal section as on line 3—3 of Fig. 2.

Referring to the characters of reference, 1 designates a fitting or coupling member having at one end a threaded aperture for connection with a pipe 2 which leads from the reservoir, not shown, or other source of air under pressure. Formed integral with and projecting from the coupling member 1 is a valve case 3 which is preferably cylindrical in form and is closed by a threaded cap 4. Within the case is a valve chamber 5 having a central opening 6 at the bottom communicating with the bore 7 of the body of the coupling member 1. Surrounding said opening 6 is an annular valve seat 8. Crossing the interior of the coupling member 1 is a transverse partition 9 which separates the bore or intake opening 7 from the educt chamber 10 except through the communicating opening 6. Threaded in the cap 4 is a valve stem 11 adapted to be turned by a hand wheel 12. The lower end of the stem 11 is swiveled in a valve 13 having an upper washer 14 and a lower washer 15 confined on opposite sides of the valve disk 16. At the forward end of the fitting or coupling member 1 is a cylindrical part 17 having a socket therein adapted to receive the projecting tubular end portion 18 of the coupling elbow 19, the opposite end of which is threaded, as at 20, for attachment to an air hose, not shown. Formed centrally through the bottom 21 of the cylindrical part 17 is an air educt port 22 which communicates with the educt chamber 10.

Projecting laterally from opposite sides of the cylindrical part 17 of the coupling member 1 are the trunnions 23. Pivotally mounted at its free ends upon said trunnions is a U-shaped clamping yoke 24 adapted to embrace the coupling elbow 19 when said elbow is inserted in said socket part, as shown, said yoke at the outer or loop end thereof carrying a screw 25 which is threaded therein and whose inner end is adapted to bear against a perpendicular shoulder 26 formed on the coupling elbow 19. Projecting outwardly from the base of said shoulder is a lug 27 adapted to be engaged by the inner end of the screw 25 to prevent the yoke dropping down too far when swung into clamping position. Fixed to the outer end of the screw 25 is an actuating handle 28.

Within the socket of the cylindrical part 17 and lying upon or against the annular bottom portion 21 of said socket which forms a circular seat, is a compressible washer 29 having a central aperture to register with the port 22. The tubular end portion 18 of the coupling elbow which is adapted to lie within the socket of the cylindrical part 17 is adapted to engage said washer and by means of the clamping yoke and screw is forcibly held thereagainst when the parts are coupled to effect a continuity of the air passage way through the coupling member 1 and the elbow 19 to the air hose. By means of said washer all escape of air between the socket part and the coupling elbow is obviated, enabling the tubular end portion of the coupling elbow to be loosely fitted within the socket part to facilitate its insertion into said part and withdrawal therefrom.

The operation of this improved air hose coupling may be described as follows:—The valve 13 remains normally closed, thereby cutting off the air from the cylindrical socket part 17 of the coupling member. When it is desired to connect the air hose with said coupling member, the tubular end portion 18 of the coupling elbow 19 is inserted in the socket of the part 17 and secured therein by swinging the yoke downwardly so as to cause the inner end of the screw 25 carried thereby to engage the shoulder 26 on said elbow, when by turning said screw through the medium of the handle 28, the inner end of the tubular portion of said elbow may be forced tightly against the washer 29, thereby effecting an air tight connection between the coupling part. The valve 13 is then opened by a manipulation of the screw 11, said valve being raised until the upper washer 14 thereof seats against the shoulder 30 formed by the depending annular flange 31 of the cap 4 whereby all escape of air through the valve chamber is prevented and the necessity of packing around the stem 11 of the valve is obviated. The opening of the valve 13 permits air to flow through the coupling member 1 and through the elbow 19 into the air hose for such use as may be desired. When it is desired to disconnect said parts the valve 13 is closed by screwing it downwardly onto its seat 8, thereby cutting off the air pressure from the coupling elbow. The clamping screw 25 is then unscrewed to release the yoke 24 which is swung upwardly, as shown by dotted lines in Fig. 1, permitting the withdrawal of the coupling elbow from the socket part 17. Upon the closing of the valve 13 the air hose connected with the elbow 19 remains full of air at a high pressure, the expansive force of which would blow the elbow 19 forcibly from the socket of the part 17 were provision not made for allowing said air to escape before disengaging the yoke from said elbow. To afford an escape for the air contained in the air hose, vent openings 32 are formed through the wall of the cylindrical socket part 17 in the plane of the face of the washer 29 so that as soon as the screw 25 is unscrewed preparatory to raising the clamping yoke 24, the pressure of the air within the hose will force the elbow outwardly and carry the inner end of the tubular end portion 18 thereof from its seat against the washer 29, thereby affording a passage for the retained air to and out the vent openings 32, thereby relieving the pressure within the hose and obviating the blowing out of the coupling elbow 19 when the yoke is raised to permit of the withdrawal of said elbow. Instead of providing the vent openings 32, the tubular member 18 may be made to fit so loosely within the socket member 17 as to afford a vent for the air contained in the air hose; however, the vent openings shown are preferred for the reason that they afford a more direct escape for the air.

Having thus fully set forth my invention, what I claim as new and desire to secure by Letters Patent, is:—

1. In an air hose coupling, the combination of a socket member having a controlling valve therein, a coupling elbow adapted to be connected with an air hose and having a tubular part adapted to enter the socket of said socket member, a washer within said socket adapted to be engaged by the tubular end of said elbow, means for clamping the coupling elbow to the socket member and forcing its tubular end against said washer, one of the coupling parts having a vent aperture which communicates with the air passage through said parts only when the tubular part of the coupling elbow is out of forcible engagement with said washer.

2. In an air hose coupling, the combination of a socket member having a controlling valve therein, a washer at the inner terminal of the socket of said member, a coupling elbow adapted to be connected with an air hose and having a tubular part adapted to make connection with the socket member to establish a continuity of the air passage way through said parts and to bear against the washer in the socket of said member, means for clamping the coupling parts together, and a vent opening in the socket member between said washer and the outer end of said socket to prevent forcible ejection of the coupling elbow upon the release of said clamping means.

3. In an air hose coupling, the combination of a socket member having a controlling valve therein, a washer in said socket, a coupling elbow adapted to be connected with an air hose and having a tubular part adapted to make connection with the socket member to establish a continuity of the air passage way through said parts and to bear against the washer in said socket, a yoke pivoted to the socket member and adapted to embrace the elbow member, and a screw carried by said yoke adapted to engage the elbow member.

4. In an air hose coupling, the combination of a coupling member having a controlling valve therein and provided with a socket, the wall of said socket having a vent opening therethrough, a second coupling member adapted for attachment to an air hose and having a part for entrance into the socket of the first mentioned member, and means for detachably clamping the coupling members together.

5. In an air hose coupling, the combination of a coupling member having a controlling valve therein, and having a socket provided with a vent opening through the wall thereof, a washer within said socket, a coupling member adapted for attachment to an air hose and having a tubular part for entrance into said socket, a yoke pivoted to the first mentioned coupling member and adapted to embrace the coupling member adapted for connection with an air hose, and a screw carried by said yoke to engage the last mentioned coupling member.

6. In an air hose coupling, the combination of a coupling member having a controlling valve therein, a second removable coupling member adapted for connection with an air hose and having a part for connection with said first mentioned member, means for detachably clamping the coupling members together to effect a continuity of the air passage way therethrough, one of the coupling members having a normally open vent aperture, and means for closing said vent aperture when the coupling parts are in forcible engagement.

In testimony whereof, I sign this specification in the presence of two witnesses.

FREDERICK W. ROCK.

Witnesses:
O. B. BAENZIGER,
I. G. HOWLETT.